United States Patent [19]

Hodson

[11] Patent Number: 4,946,504

[45] Date of Patent: Aug. 7, 1990

[54] CEMENT BUILDING MATERIAL

[75] Inventor: Simon Hodson, Santa Barbara, Calif.

[73] Assignee: Concrete Technology Corporation, Santa Barbara, Calif.

[21] Appl. No.: 235,042

[22] Filed: Aug. 19, 1988

[51] Int. Cl.$^5$ ................................................ C04B 7/00
[52] U.S. Cl. ..................................... 106/713; 106/796
[58] Field of Search ................................... 106/76, 120

[56] References Cited

U.S. PATENT DOCUMENTS

| | | | |
|---|---|---|---|
| 4,162,924 | 7/1979 | Kubo et al. | 106/99 |
| 4,274,881 | 6/1981 | Laugton et al. | 106/99 |
| 4,298,561 | 11/1981 | Uchida et al. | 106/120 |
| 4,427,611 | 1/1984 | Oguri et al. | 106/120 |
| 4,683,003 | 7/1987 | Nakano et al. | 106/90 |
| 4,775,505 | 10/1988 | Kuroda et al. | 106/119 |

OTHER PUBLICATIONS

Abstract, Taylor, "Proposed Structure for Calcium Silicate Hydrate Gel", J. Am. Ceram. Soc., 69(9), 464–7.

Williamson, "Constitutional Supersaturation in Portland Cement Solidified by Hydration", J. Crystal Growth, vol. 3,4, pp. 787–794 (1968).

"Design and Control of Concrete Mixtures", Thirteenth Edition, by Steven H. Kosmatka and William C. Panarese, 1988, Illinois at p. 96.

*Primary Examiner*—Brian E. Hearn
*Assistant Examiner*—Andrew Griffis
*Attorney, Agent, or Firm*—Spensley, Horn, Jubas & Lubitz

[57] ABSTRACT

A paste with improved workability is formed from at least 20% Portland cement. The paste when cured under ASTM conditions crystallizes into a substantially homogeneous mass of monolithic crystals of calcium silicate hydrate exhibiting a unique crystalline structure and having improved compressive strength.

6 Claims, 12 Drawing Sheets

WATER-CEMENT PASTE 2" CUBE SAMPLES

CEMENT BUILDING MATERIAL

BACKGROUND OF THE INVENTION

1. Field of the Invention

The present invention relates to a cement building material.

2. Description of Related Art

In the construction and building industry concrete is generally defined as a mixture of two components, aggregates and paste. The paste, which typically includes Portland cement and water, binds the aggregates (sand and gravel or crushed stone) into a rocklike mass as the paste hardens. The paste hardens because of the chemical hydration reaction between cement and water. In this regard, the technology of concrete is discussed in S. H. Kosmatka and W. C. Panarese, "Design and Control of Concrete Mixtures," 13th edition, Portland Cement Association, 1988.

The paste component of concrete, either separate from or combined with aggregate, forms a relatively continuous and consistent solid when cured. In conventional cured paste, voids or small discontinuities are normally found which have a deleterious affect on the performance characteristics of the cured paste and concrete. Commonly such limitations on performance characteristics include failure under heavy load and stress conditions.

The most common constituent of the bonding material in the concrete, i.e., that which bonds the aggregate, is Portland cement paste. The four principal chemical constituents of Portland cement are tricalcium silicate, dicalcium silicate, tricalcium aluminate and tetracalcium aluminoferrite. These components react with water (hydration) causing the setting and hardening of the cement. The process of cement hydration is characterized by the formation of a polymorphic crystalline mass as discussed below.

Studies have found that the constituents of Portland cement experience generally constituent specific partial hydration when processed by conventional means. This results in characteristic polymorphic crystalline formations of calcium silicate hydrate and calcium sulfoaluminate "ettringite" (exemplified by a needle-like structure), calcium hydroxide "Portlandite" (characterized by hexagonal crystalline plates), a spindle columnar crystal structure and an amorphous calcium silicate crystal structure. Colonies of these polymorphic crystalline mass formations are observed in random disposition relative to each other within typical cured cement pastes. This visually observably dissimilar crystallization has long been accepted and attributed to the chemical reaction between water and the tricalcium silicate, dicalcium silicate, tricalcium aluminate and tetracalcium aluminoferrite components.

SUMMARY OF THE INVENTION

The present invention is directed to a unique crystalline building material formed by curing a novel paste formed from cement and water.

By attempting to achieve substantially complete hydration by homogenous mixing of cement and water, a building material of improved strength, handling characteristics and overall performance is realized. The building material has fewer random entrapped air voids, a greater homogeneity of hydrated compounds, fewer partial or incomplete hydrated compounds, and a more fully developed homogeneous monolithic crystalline structure.

When cured and set, substantially all of the novel paste crystallizes into a homogeneous mass of monolithic calcium silicate hydrate crystals. Visual inspection shows that each of the monolithic masses are composed of a block of well defined plates of geometric uniformity which may be hexagonal. These well defined plate crystals are uniform and are much more fully developed and much larger than those observed in conventional partially hydrated Portland cement. The more fully crystallized plates may grow in strata-type formation to form an extremely high density matrix accounting for the decrease in the number of voids and increased strength.

A comparison between the compressive strength of cured conventional paste and the building material of the present invention shows the building material of the present invention to be significantly stronger.

Moreover by adding aggregates to the homogeneous paste, and then mixing again, a superior performance concrete is formed following curing.

DETAILED DESCRIPTION OF THE PREFERRED EMBODIMENT

The crystalline building material of the present invention is formed from a paste having a cement component of at least 20% and preferably 75% by weight Portland cement. After curing the paste, a substantially homogeneous mass of monolithic crystals of similar uniform geometric configuration are formed. The homogenous mass of crystals is very dense with less than 10%, and preferably less than 1% by volume, intraped voids. This building material is produced by a novel process of mixing Portland cement and water in a novel cement paste generator, as more fully described below, and curing the cement paste generated in accordance with ASTM standards.

In a preferred embodiment the building material of the present invention is produced by mixing a predetermined volume of Portland cement including one or more of the following compounds: tricalcium silicate, dicalcium silicate, tricalcium aluminate and tetracalcium aluminoferrite in powder form with water in a particular water to cement ratio, and forming an cementitious paste. The water to cement ratio can range from 0.20 to 2.00.

Figure 1:
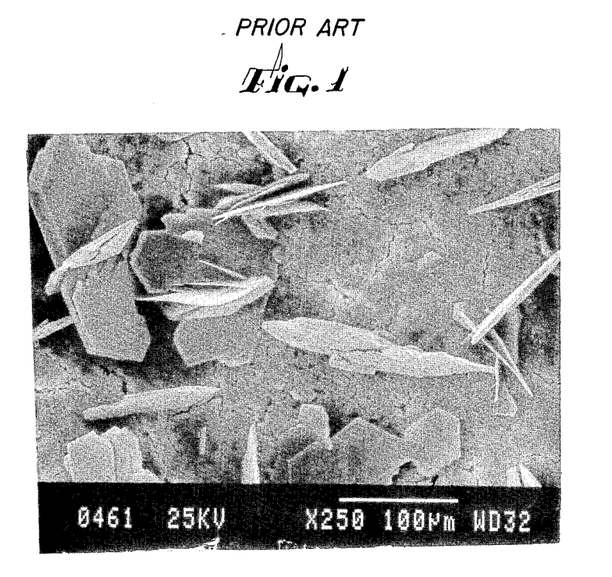
FIG. 1 is a photograph of conventional seven day cured mortar ASTM C109 at a magnification of 250 showing plates of calcium hydroxide.
Figure 2:
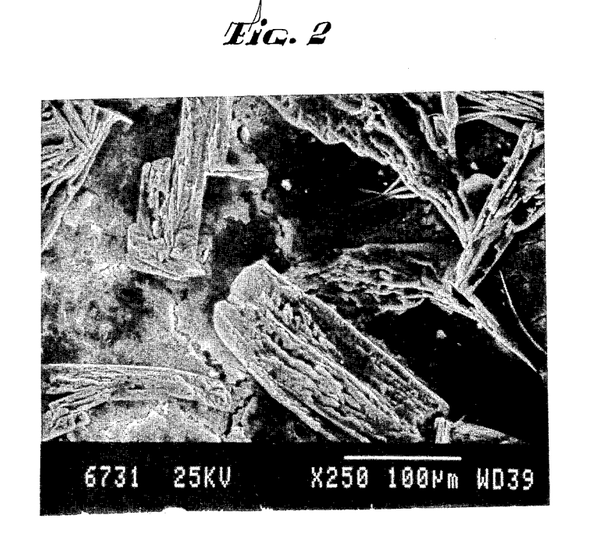
FIG. 2 is a photograph of seven day cured mortar of the present invention ASTM C109 at a magnification of 250 showing monoliths of calcium silicate hydrate.
Figure 3:
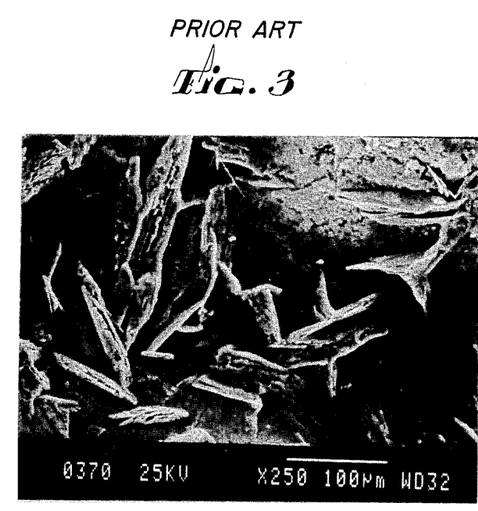
FIG. 3 is a photograph of conventional 28-day cured mortar ASTM C109 at a magnification of 250 showing plates of calcium hydroxide.
Figure 4:
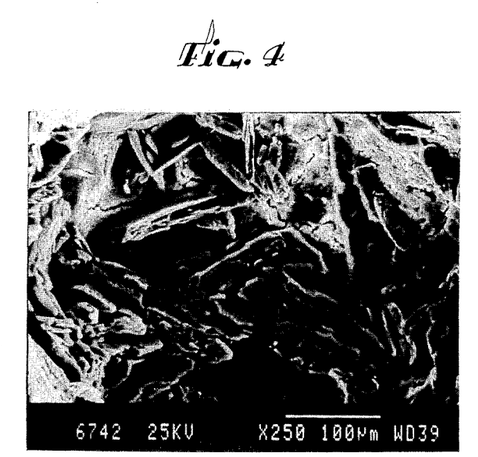
FIG. 4 is a photograph of 28-day cured mortar of the present invention ASTM C109 using the mixer of Example 2 at 500 rpm, 120 second mix time and 8 baffles, at a magnification of 250 showing monoliths of calcium silicate hydrate.
Figure 5:
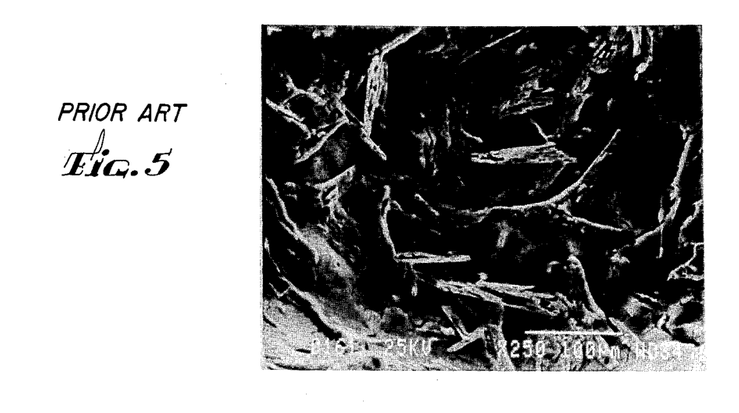
FIG. 5 is a photograph of conventional seven day cured mortar ASTM C109 at a magnification of 250.
Figure 6:
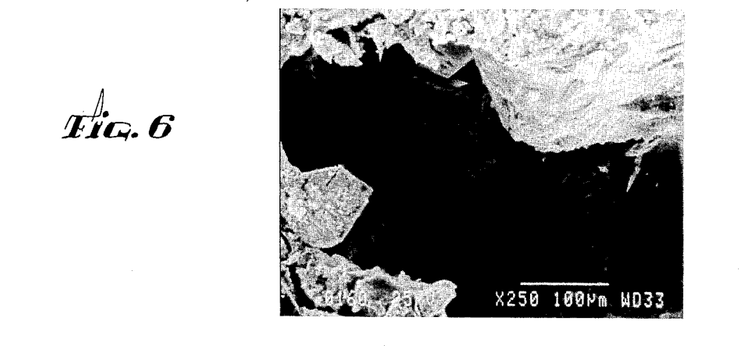
FIGS. 6 and 7 are photographs of seven day cured mortar of the present invention ASTM C109, made using the mixer of Example 1 at 750 rpm, a 30 second mix time and 8 baffles, at a magnification of 250 showing the degree of plate formation. Unlike conventional material where the plates are formed from needles, the monoliths are not formed from needles in the building material of the present invention.
Figure 7:
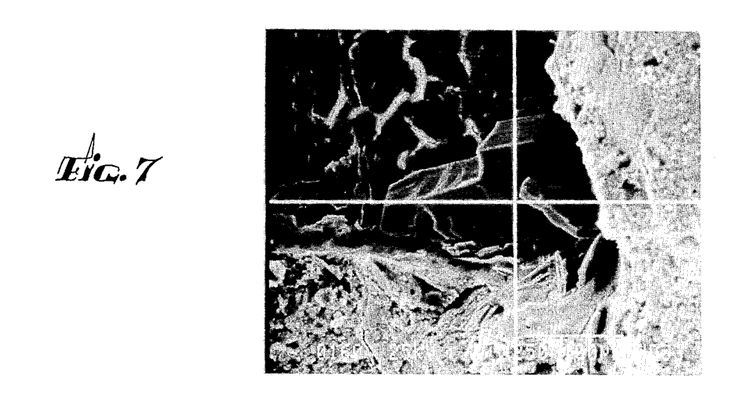
Figure 8:
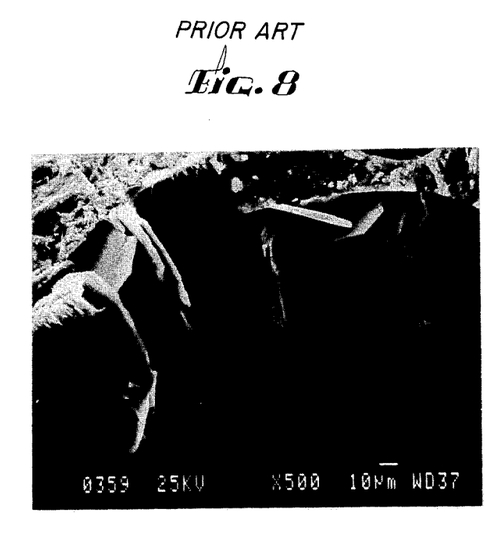
FIG. 8 is a photograph of conventional seven day cured mortar ASTM C109 at a magnification of 500 showing well formed calcium hydroxide plates, calcium silicate hydrate needles, ettringite needles and calcium silicate hydrate gel structure.
Figure 9:
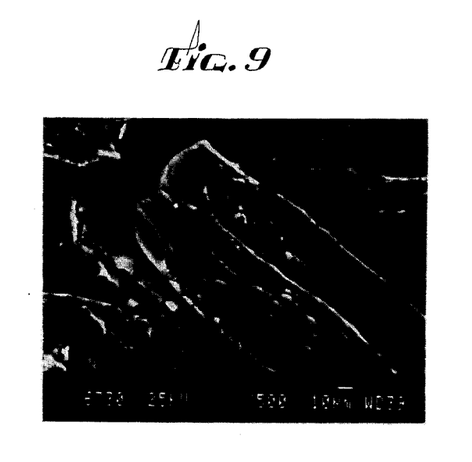
FIG. 9 is a photograph of seven day cured mortar of the present invention ASTM C109 at a magnification of 500 showing monoliths of calcium silicate hydrate.
Figure 10:
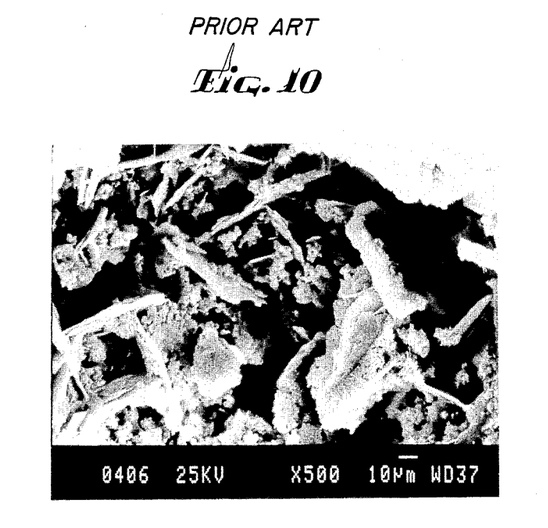
FIG. 10 is a photograph of conventional one day cured paste ASTM C109 at a magnification of 500 showing calcium silicate hydrate needles, ettringite, amorphous formations, and calcium hydroxide plates.
Figure 11:
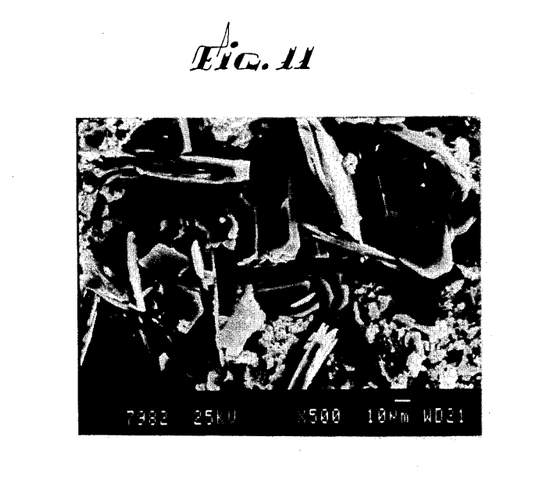
FIG. 11 is a photograph of one day cured paste of the present invention ASTM C109 at a magnification of 500 showing calcium silicate hydrate monoliths without needles. This material was produced using the mixer of Example 1 at maximum rpm with 12 baffles and 120 second mix time.
Figure 12:
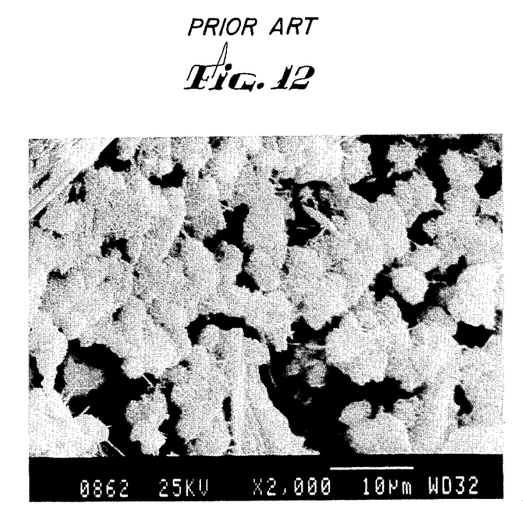
FIG. 12 is a photograph of conventional seven day cured mortar ASTM C109 at a magnification of 2,000 showing calcium silicate hydrate needles, amorphous plates, calcium aluminum hydrate and other trace compounds.
Figure 13:
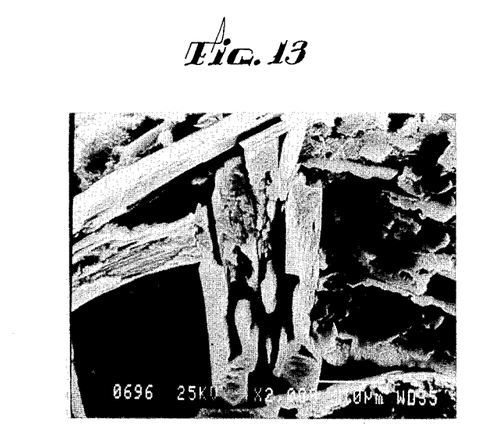
FIG. 13 is a photograph of seven day cured mortar ASTM C109 of the present invention at a magnification of 2,000 showing calcium silicate hydrate monoliths, with particular focus on the initial growth of the monoliths not arising from needles. This material was produced using the mixer of Example 1 at 650 rpm, 120 second mix time and 8 baffles.
Figure 14:
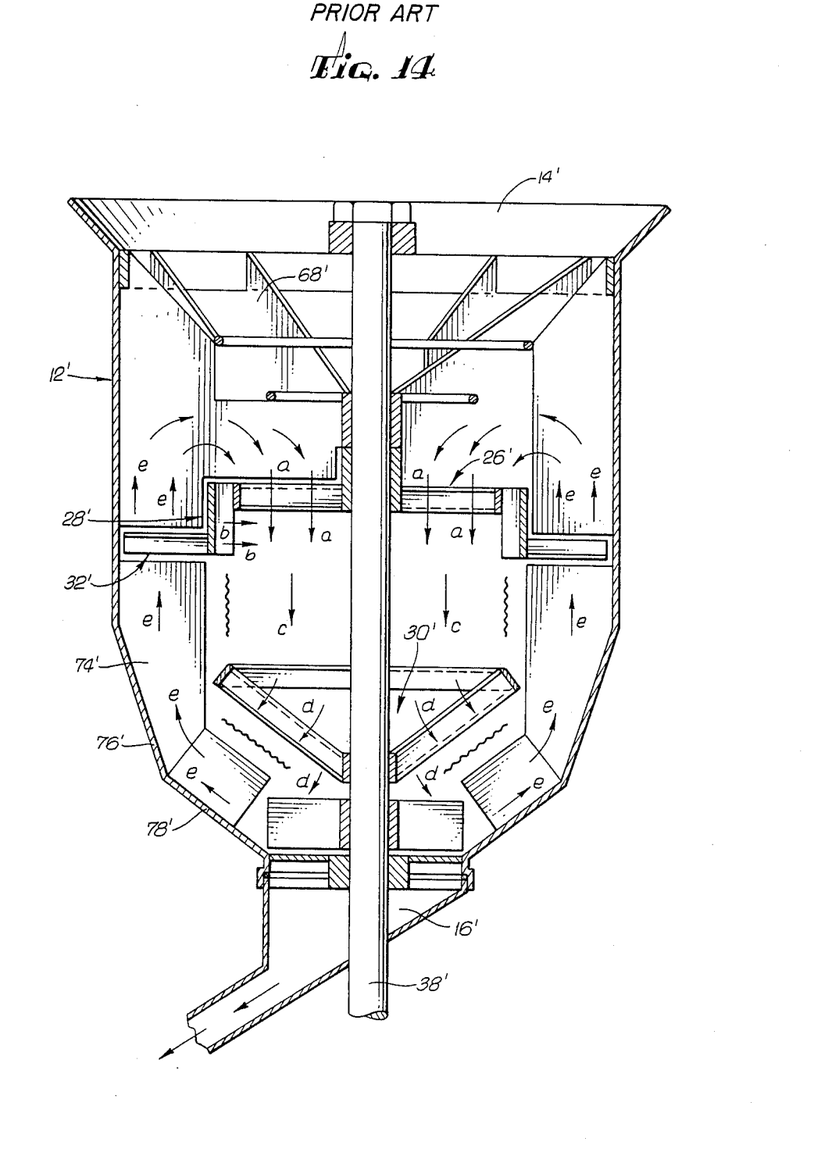
FIG. 14 is a prior art cement paste generator and particularly that of U.S. Pat. No. 4,552,463.

FIGS. 8, 10 and 12 show the incomplete hydration crystalline products typically observed after curing conventional paste constituents. Conventional Portland cement polymorphic crystalline products are characterized by randomly dispersed colonies of calcium silicate hydrate, ettringite, Portlandite, columnar and amorphous crystals that are composed of tricalcium silicate, dicalcium silicate, tricalcium aluminate and tetracalcium aluminoferrite which react separately or incompletely with water. This visually observable dissimilar crystallization has long been accepted and explained in terms of the chemical reaction between tricalcium silicate, dicalcium silicate, tricalcium aluminate and tetracalcium aluminoferrite compounds, and water as discussed above.

In conventional cured mortar, there are, among other formations, needles and plates: the needles are calcium silicate hydrate and the plates are calcium hydroxide. In the mortar of the present invention there are almost no needles, and the monolithic crystals are formed of calcium silicate hydrate.

Substantially all of the paste resulting from processing Portland cement and water in the cement paste generator described below crystallizes into a uniform monomorphic mass of monolithic crystals formed of plates of similar geometric configuration as shown in FIGS. 2, 4, 6, 7, 9, 11 and 13, wherein substantially means at least 30%, preferable greater than 75%, and more preferably, greater than 95% by volume. Specifically, visual inspection shows that each of the individual monolithic crystals includes a well defined block of plates of similar geometric uniformity. These well defined plate crystals are much more fully developed and are much larger than those observed in conventional partially hydrated Portland cement as shown in FIGS. 8, 10 and 12.

A comparison of FIG. 1–13, shows three significant differences. First it is observed that the crystals of the present invention are substantially larger than conventional material. Second, the well-defined geometry of the crystals of the present invention graphically illustrates the more complete development of the crystals. Third, the more uniform geometry of the crystals of the present invention from a more dense packing results in a more consolidated crystalline building material.

The crystal growth that takes place in at least 1 day is characterized by a single monolithic, monomorphic material composed of crystals that have grown together as shown in FIGS. 5–7 and 11.

Extensive testing and comparative analysis has been conducted between the crystals resulting from curing conventional mortar that was made in accordance with ASTM C109 standard and the crystals resulting from curing the mortar of the present invention produced with a paste of initial water to cement ratios ranging from 0.30 to 0.50 and subsequently mixed with standard sand and curred in accordance with ASTM C109 standard.

Figure 15:
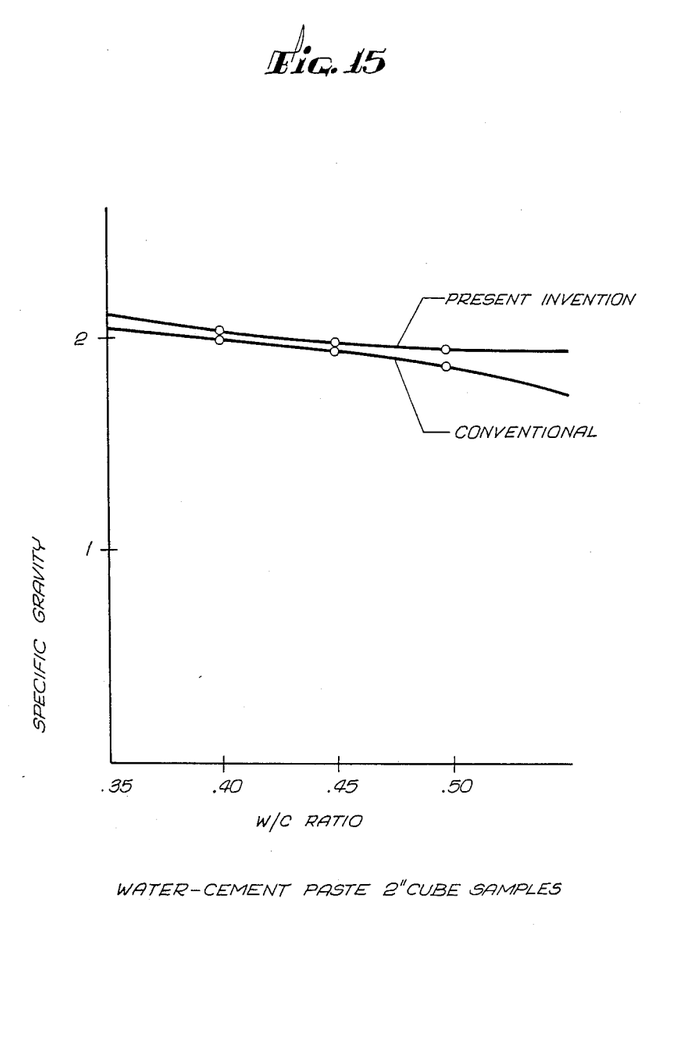
FIG. 15 is a comparison of the specific gravity of the crystalline building material of the present invention and conventional cement.

Table I is a comparison of the flow and thus relative workability of mortar of the present invention as compared to conventional mortar made in accordance with ASTM C109 standard. As shown, the mortar of the present invention has superior flow. Table II is a comparison of the compressive strength (psi) of 28 day cured cubes of conventional mortar and the mortar of the present invention. As shown, the mortar of the present invention is significantly stronger. FIG. 15 is a comparison of the specific gravity of 28 day cured paste cubes of conventional paste and the cured paste of the present invention. As shown, the cured paste of the present invention has a higher specific gravity, and preferably at least 1% higher.

The more fully developed plates of the crystals of the present invention may grow in a strata-type formation to form extremely high density matrixes. This accounts for the decrease in the number of voids and discontinuities, and the increased strength of the crystals of the present invention. This hydrated cement building material thus exhibits improved strength, workability and overall performance characteristics.

It should also be appreciated that there are less voids in the crystalline building material of the present invention when compared to conventional crystalline material, and voids which are more uniform in size and shape. The voids of conventional crystalline material have a great disparity in size and shape; whereas, for the present invention, it is preferred that greater than 75% of the voids be round and of about the same size, and more preferred that greater than 90% of the voids be round and of about the same size.

Samples of conventional crystals examined contained very few, if any, fully developed plate crystals. On the other hand, in the samples of the hydrated cement building material of the present invention, the monolithic plate crystals appear to fill substantially every void and cover virtually the entire surface. This surface has a gloss appearance demonstrative of the molecular arrangement associated with a high degree of hydration.

From observation, the more complete mixing and hydration of Portland cement that occurs in the process of the present invention results in greater homogeneity of the building material. The basic structure being the formation of plate crystals with a shape that is consistent and easy to recognize. This represents a fundamental improvement in concrete technology that will manifest itself in universally better performance and introduce a wider range of applications for concrete.

With reference to FIGS. 2, 4, 6, 7, 9, 11 and 13, it can be seen that the crystals of the present invention are homogeneous for a given volume of cured paste, that is, there are greater than 20%, preferably greater than 75%, and more preferably greater than 95% by volume of monolithic crystals as compared to less than about 10% volume of less developed monolithic crystals in conventional crystalline material as shown in FIGS. 8, 10 and 12. On the other hand, conventional material principally consists of calcium silicate hydrate needles. In this regard, the term monolithic is generally meant to mean a unitary structure in the form of a block as compared to a needle which is generally meant to mean a slender pointed structure.

Using the crystals of the present invention, established design strengths have been achieved with up to 45% and commonly 10 to 20% less cement, and more than 10% greater strengths have been achieved with an equivalent cement to aggregate and water ratio as required in current practice.

Integral bonding of the building material of the present invention to existing concrete or mortar permits the use of thin section overlays without the necessity of additional bonding agents. In addition, a gap-grated aggregate using the hydrated cement building material of the present invention can produce a pervious material of high strength capable of handling water flow rates up to 20 inches per minute. This can reduce or often eliminate the need for positive drainage in retention systems and can virtually eliminate hydroplaning on concrete pavement.

The building material according to the present invention has been found to exhibit a distinctive x-ray diffraction pattern as determined by powder diffractometry. Those skilled in the art will recognize what is meant by the term x-ray diffraction pattern as determined by powder diffractometry. X-ray diffraction involves the diffraction of a collimated monochromatic x-ray beam from a powdered sample containing a large number of tiny crystals having a random orientation. The incident x-ray radiation is provided by a copper source. The diffracted radiation is detected by a high purity germanium solid state detector. As the x-ray source is rotated through angle $\theta$, the intensity of the x-ray radiation diffracted from the powdered sample is measured as the x-ray detector is rotated through angle $\theta$($\theta$-$\theta$ method). Peaks observed correspond to the intensity of the diffracted x-rays as a function of $2\theta$.

The x-ray diffraction pattern of the building material according to the present invention was determined on a Scintag Pad-X Powder Diffractometer in the following manner. A cured paste building material according to the present invention was ground into a powder and packed in a standard sample container, thus providing a powdered sample having a large number of individual crystals arranged in a random orientation. The powdered sample was placed in the powder diffractometer and subjected to copper K-2 radiation. The slits on the x-ray source were 2 millimeters and 4 millimeters, with the receiving slits being 0.1 millimeter and 0.3 millimeter. The diffracted radiation intensities were recorded from 15°–70° in $2\theta$. The powder diffractometer was operated in a continuous scan mode with a sampling interval of 0.02° and a scan rate of 2° per minute.

As compared to the standard $2\theta$ values of calcium hydroxide, silicon and calcium silicate, there are two $2\theta$ values that are unique, namely, $2\theta$ of $23\pm0.2$ and $2\theta$ of $37.1\pm0.2$.

Known building materials similar in composition and use to the building material of the present invention do not possess the same combination of crystal structure and having the elemental composition as the building material of the present invention. That is, while building materials having a similar elemental composition may be available, those building materials do not possess the crystal structure and energy dispersive x-ray analysis pattern of the claimed crystalline building material. Hence, the strength, performance and usable application of the building material of the present invention is superior to conventional materials.

In this regard, the compressive strength of the preferred building material of the present invention is at least 10% greater than that of conventional material for a given water to Portland cement ratio, the specific gravity of the preferred building material of the present invention is at least 1% greater than that of conventional material for a given water to Portland cement ratio, and the porosity of the preferred building material of the present invention is at least 5% less than that of conventional material for a given water to Portland cement ratio.

FIGS. 16–23 show one embodiment of the cement paste generator which produces the novel paste of the present invention which when cured produces the novel crystalline material of the present invention. Sand and aggregate can be added to the paste to produce the novel mortar and concrete of the present invention.

Figure 16:
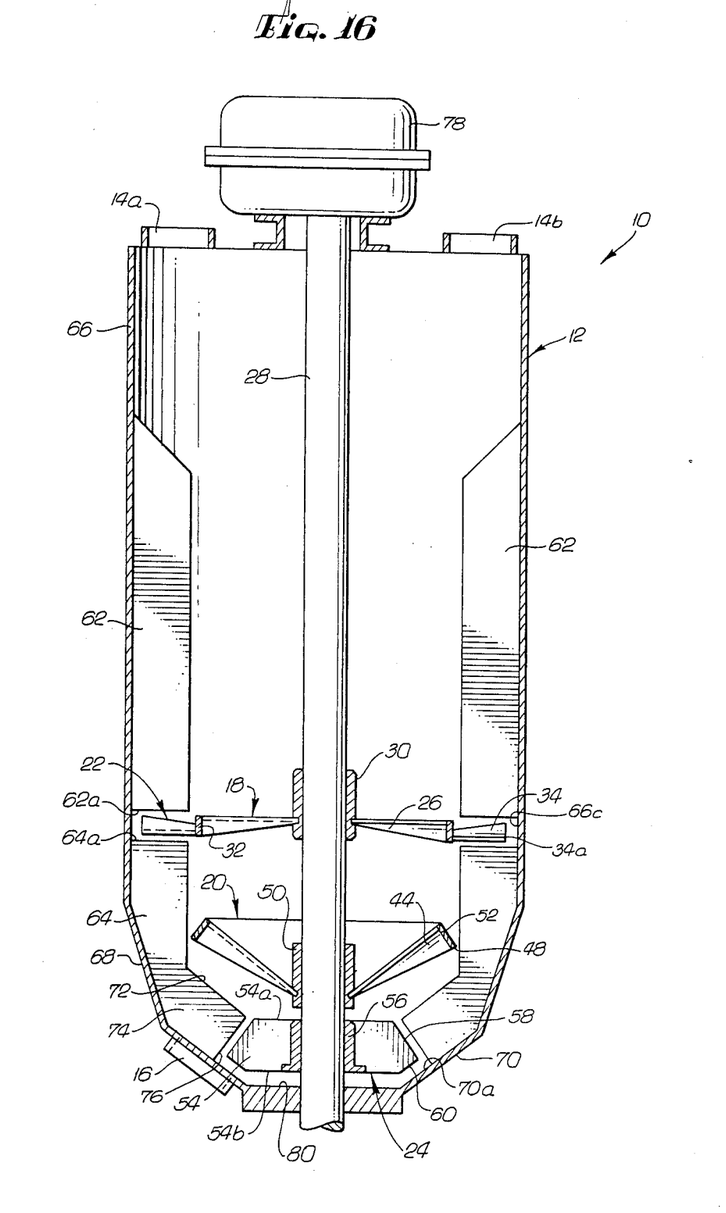
FIG. 16 is a cross-sectional schematical side view of the cement paste generator of one embodiment the present invention.

The cement paste generator generally indicated as 10 includes a generally cylindrical hollow housing or enclosure generally indicated as 12 having a feed inlet generally indicated as 14a formed in the upper portion of the housing to supply dry Portland cement to the interior of the hollow housing 12, a feed inlet 14b for supplying water, a discharge outlet generally indicated as 16 formed in the lower portion of the housing to discharge the resulting paste of the present invention and a longitudinally disposed rotatable shaft 28.

As shown in FIG. 16, the inner surface of the housing 12 includes a substantially cylindrical upper portion 66, a conical middle portion 68 and a conical lower portion 70.

As described more fully below, the housing 12 is configured to operatively house a thrust generating assembly and a directional control assembly to cooperatively form liquid mass flow patterns moving in various directions relative to each other within the hollow housing 12.

As previously discussed, the Portland cement paste generator has certain critical operating parameters and critical dimensions. If these critical parameters and dimensions are not employed, the specified embodiment of the generator will not facilitate the production of the novel paste of the present invention. As used hereinafter, use of the broadest range of the critical operating parameters and critical dimensions will provide greater than 50% by weight of the novel crystals of the present invention when the paste created by the cement paste generator is cured according ASTM standards. When the preferred critical operating paramaters and critical dimensions are used, greater than 95% by weight of such crystals are produced at a water to cement ratio of 0.33.

The thrust generating assembly includes a downthrust generating component and an upthrust generating component.

As shown in FIG. 16, the downthrust generating component includes a single upper set and a lower set of blades generally indicated as 18 and 20, respectively. The upthrust generating component includes an upper and a lower set of blades generally indicated as 22 and 24, respectively.

Figure 18:
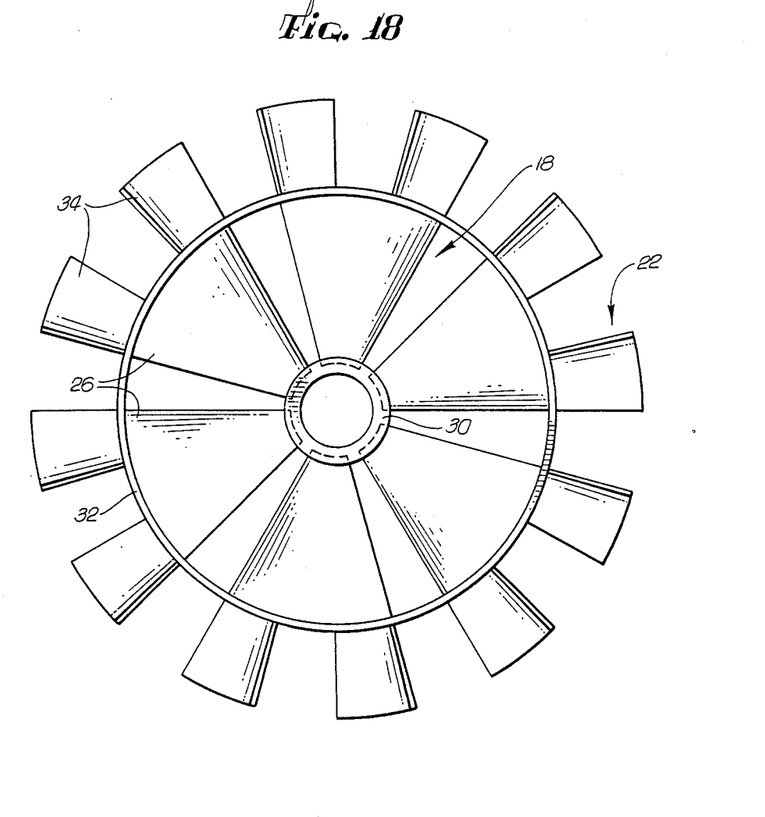
FIG. 18 is a top view of the upper set of downthrust blades of one embodiment of the cement paste generator of the present invention.

As best shown in FIGS. 16 and 18, the single upper set of downthrust blades 18 includes at least two and preferably six substantially horizontal blades 26 coupled to drive shaft 28 in spaced relation relative to each other by an upper collar 30. The outer end of each of the substantially horizontal upper down blades 26 is interconnected by an upper annular support ring 32.

Figure 20:
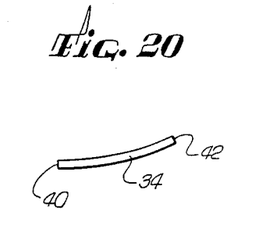
FIG. 20 is a partial cross-sectional end view of an upper upthrust blade of one embodiment of the cement paste generator of the present invention.

As best shown in FIGS. 16, 18 and 20, the upper set of upthrust blades 22 includes at least six and preferably twelve substantially horizontal blades each indicated as 34 affixed in spaced relation relative to each other on the upper annular support ring 32. As shown in FIG. 20, each of the plurality of substantially horizontal upper upthrust blades 34 includes a leading and trailing edge indicated as 40 and 42, respectively. As discussed below, it has been discovered that the smallest distance "G1" between the leading edge 40 of the upper upthrust blade and the lower edge 62a of the upper baffle 62 is critical. Other important, but not necessarily critical dimensions include G2, the smallest distance between the trailing edge 42 of the upper upthrust blade and the upper edge 64a of the lower baffle 64, and G4, the smallest distance between the outermost end of the upper upthrust blade 34a and the cylindrical inner wall portion of the housing 66a.

Figure 19:
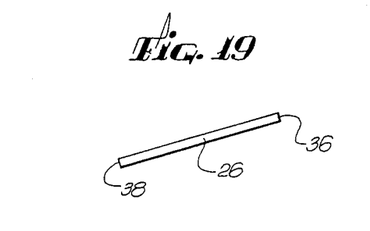
FIG. 19 is a partial cross-sectional end view of an upper downthrust blade of one embodiment of the cement paste generator of the present invention.

As shown in FIGS. 16, 18 and 19, each of the plurality of substantially horizontal upper downthrust blades 26 is substantially pie-shaped in configuration, with each having a leading edge and trailing edge indicated as 36 and 38, respectively.

Figure 21:
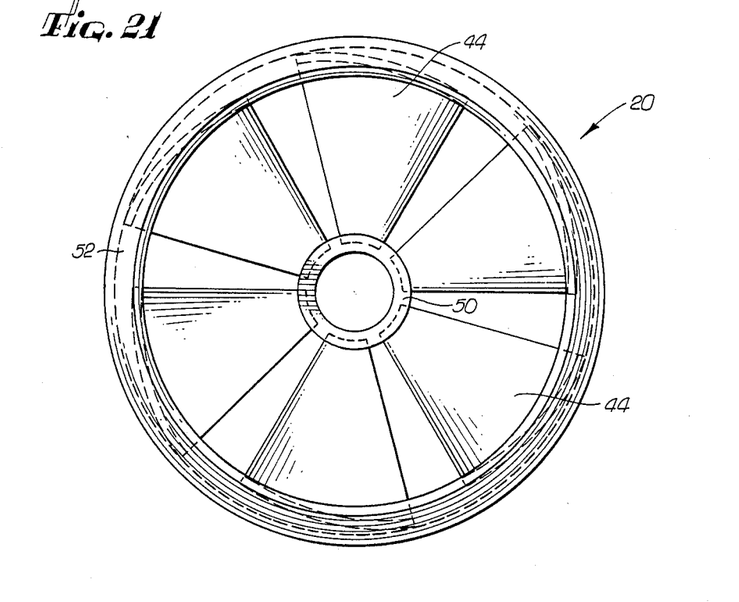
FIG. 21 is a top view of the lower downthrust blades of one embodiment of the cement paste generator of the present invention.

As shown in FIGS. 16, 18 and 21, the lower set of downthrust blades 20 includes at least two and preferably six inclined blades each indicated as 44, with each including a leading edge 46 and a trailing edge 48 and having a configuation similar to that of the substantially horizontal upper downthrust blades 26. The lower portion of each inclined intermediate downthrust blade 44 is attached to the drive shaft 28 by an intermediate collar 50, and the upper portions are affixed to an intermediate support ring 52 such that the intermediate downthrust blades 44 form a substantially conical configuration relative to the drive shaft 28. As described below, the conical plane of the intermediate downthrust blades 44 is substantially parallel to lower portion 70 of the housing 12.

To direct the vertical movement of the mixing paste, an upper and lower directional control means is provided. As shown in FIG. 16, the upper directional control means preferably includes a plurality, preferably 2–12, and more preferably 8, vertically disposed flat baffles each indicated as 62 extending radially inwardly from the housing 12. The lower directional control means includes a plurality, preferably 2–12, and more preferably 8 vertically disposed flat baffles each indicated as 64 extending radially inwardly from the housing 12.

Figure 17:
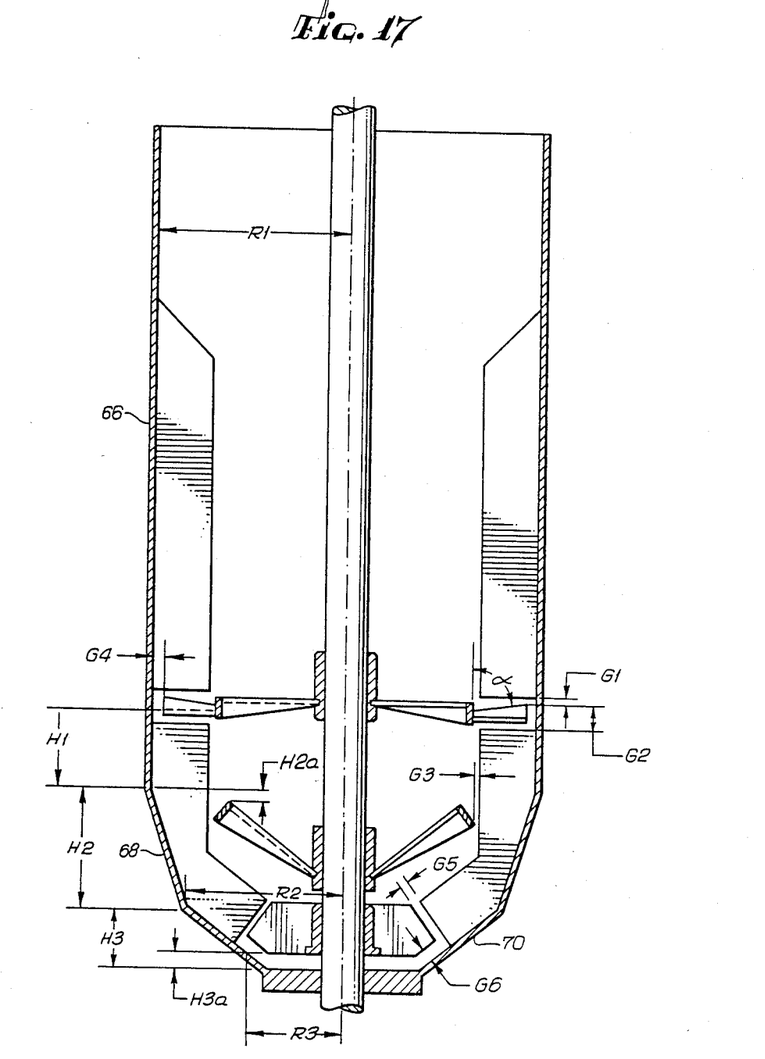
FIG. 17 is a cross-sectional schematical view of one embodiment the cement paste generator of the present invention showing certain dimensions.

With further reference to FIG. 17, another critical dimension is "G5", the smallest distance between the trailing edge 58 of the lower upthrust blade and the lower free edge 76 of the opposing lower baffle. Other important but not necessarily critical dimensions are "G3", the smallest horizontal distance between the trailing edge 48 of the lower downthrust blade and the outer edge of the opposing lower baffle 64, and "G6", the smallest distance between the leading edge 60 of the lower upthrust blade and the lower conical inner wall portion of the housing 70a.

Figure 22:
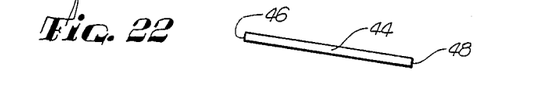
FIG. 22 is a partial cross-sectional end view of a lower downthrust blade of one embodiment of the cement paste generator of the present invention.
Figure 23:
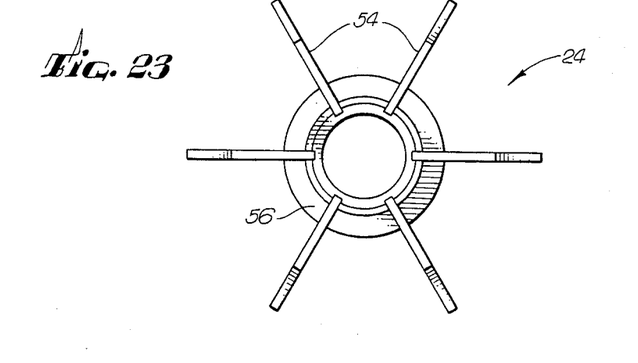
FIG. 23 is a cross-sectional top view of the lower downthrust blades of one embodiment of the cement paste generator of the present invention.

As shown in FIGS. 16 and 22, the lower set of upthrust blades 24 includes at least two and preferably six flat substantially vertical blades each indicated as 54 coupled to the drive shaft 28 by lower collar 56. As shown in FIG. 16, the outer portion of each flat substantially vertical lower upthrust blade 54 includes an upper and lower edge indicated as 58 and 60, respectively, inclined relative to each other. The lower edge is preferably parallel to the lower conical wall portion 70 of the housing 12.

As shown in FIG. 16, the lower inclined portion 70, the inner edges 72 of the lower portion 74 of the lower baffles 64, the conical plane formed by the lower downthrust blades 44 and the lower edges 60 of the flat substantially vertical lower upthrust blades 54, are all substantially parallel relative to each other. Similarly, the lower edges 76 of the lower portion 74 of the lower baffles 64 are substantially parallel to the upper edges 58 of the flat substantially vertical lower upthrust blades 54.

Also with reference to FIG. 17, three radii R1, R2 and R3, three critical heights H1, H2 and H3, and two critical vertical distances H2a and H3a can be defined. Ratios of these radii, heights and vertical distances have been found to be critical to the structure of the generator.

R1 is the radius of the cylindrical portion of the inner wall of the housing, R2 is the smallest radius of the middle conical portion of the inner wall of the housing within the plane containing the upper edge 54a of the lower upthrust blade, and R3 is the smallest radius of the lower conical portion of the inner wall of the housing along the plane containing the lower edge 54b of the lower upthrust blade.

H1 is the vertical distance, along the shaft, between the horizontal plane containing the leading edge of the upper upthrust blade and lower end of the cylindrical portion 66 of the housing, H2 is the distance, along the shaft 28, between the horizontal plane containing the lower end of the cylindrical portion 66 of the housing and the horizontal plane containing the lower end of the middle conical portion 68 of the housing, and H3 is the distance, along the shaft 28, between the horizontal plane containing the lower end of the middle portion of the housing 68 and the horizontal plane containing the lower end of the lower conical portion 70 of the housing.

In general the upper downthrust/upper upthrust blade assembly must be higher than the middle downthrust blades which in turn must be higher than the lower upthrust blades. With reference to FIGS. 16 and 17, H2a is the smallest vertical distance between the height (along the shaft) containing the horizontal plane of the upper most portion of the lower downthrust blade and the horizontal plane containing the largest radius of the middle conical portion 68 of the housing. H3a is the smallest vertical distance between the bottom 80 of the mixer and the lowest portion of the lower upthrust blade.

In order to produce the novel paste of the present invention, it is necessary that the radii, height and vertical distance dimensions be chosen to be within certain critical ratios. For R1 ranging from 4.0 to 48.0 inches, it is critical that the ratio of R1 to H1 range from 0.39 to 0.45, the ratio of R1 to R2 range from 0.80 to 0.83, the ratio of R1 to H2 range from 0.59 to 0.61, the ratio of R1 to R3 range from 0.36 to 0.41, and the ratio of R1 to H3 range from 0.30 to 0.32, the ratio of R1 to H2a ranges from 0.001 to 1.0, and the ratio of R1 to H3a ranges from 0.001 to 1.0.

The gap distances G1-G6 shown in FIG. 12 constitute six mechanically induced shear zones. The gap distances are relative to the critical average blade tip velocity "S" (in feet per second) of the two upthrust blades and the two downthrust blades.

For R1 ranging from 4.0 to 48.0 inches, G1-G6 should range from 0.1 to 2.0 inches. The preferred ranges for G1-G6 are G1=0.20±0.125, G2=0.20±0.125, G3=0.20±0.125, G4=0.38±0.125, G5=0.25 ±0.125 and G6=0.50±0.125.

With reference to FIG. 17, it should be appreciated that that angle "α" between the outer face of the support ring 32 and the trailing edge of the upper upthrust blade ranges from 45°-90°, and is preferably 80°.

For R1=8.0 inches, shaft rpm can range from 300-900, and preferably 500. For R1=24 inches, shaft rpm can range from 150-250, and preferably 165. In these preferred cases, G1-G3 are 0.20, G4 is 0.38, G5 is 0.25 and G6 is 0.50.

In addition to the critical dimensions discussed above, there are critical processing parameters. The relationship between shaft rpm and R1 must be such that the product of R1 multiplied by shaft rpm ranges from 2,000 to 7,000, with the preferred range being from 4,000 to 5,000.

The paste volume ("V") is also critical. The stationary paste volume should range from a height of 0.5 H1+H2+H3 as a minimum to a height of H1+H2+H3+(4×R1) as a maximum. The preferred range is between a resting volume height on the shaft of H1+H2 +H3+0.5 R1 to as resting volume height on the shaft of H1+H2+H3+2.5 R1.

Mix time ("MT") is relative to volume and water to cement ratio. The relationship is such that the higher the water to cement ratio the less critical the mix time, and the higher the volume the longer the mix time. In general, the paste of the present invention can be produced using the generator, and the rpm and volume ranges, discussed above in a mix time ranging from 20 seconds to 300 seconds, with the preferred mix time being 60 to 120 seconds.

Water to Portland cement ("W/C") ratio ranges from 0.20 to 2.00 with a preferred range of 0.30 to 0.50. This range is using a typically available Portland cement and typically available water, but without the affect of admixtures or other chemicals. The addition of chemicals may alter the total range and/or preferred range of water to cement ratios.

In general, the building material of the present invention is produced by curing the paste of the present invention preferably generated by the apparatus discussed above. The building material of the present invention is substantially monolithic crystals, and in paste form, can be mixed with sand to produce the mortar and with aggregate to produce concrete. The paste is generally produced by mixing a predetermined water to cement ratio at a predetermined velocity within an enclosure for a predetermined time period.

Lastly it should be appreciated that the shaft is rotated by mechanism means for rotation 78 which is apparent to those of skill in the art.

EXAMPLE 1

A cement paste generator was constructed wherein, in inches, R1=24.75, H1=9.75, R2=19.81, H2=14.50, R3=9.00, H3=7.50, H2a=0.11, H3a=0.02, G1-G3=0.20, G4=0.38, G5=0.25, G6=0.50, V=26.96 cubic feet and shaft rpm=165. Using W/C of 0.30 to 0.50 and MT of 60-90 seconds, the compressive strength of the cured concrete increased 15-20% as compared to conventionally batched and mixed concrete tested in accordance with ASTM C39 standard.

EXAMPLE 2

A cement paste generator was constructed wherein, in inches, R1=8.00, H1=3.60, R2=6.50, H2=4.90, R3=3.25, H3=2.37, H2a=0.06, H3a=0.07, G1-G3 =0.20, G4=0.38, G5=0.25, G6=0.50, V=0.99 cubic feet and shaft rpm=500. Using W/C of 0.30 to 0.50 and MT of 60-90 seconds, the compressive strength of the ASTM C109 prepared mortar increased 15-20% as compared to conventionally batched and mixed mortar when tested in accordance with ASTM C109 standard.

EXAMPLE 3

A cement paste generator was constructed wherein, in inches, R1=24.00, H1=11.75, R2=19.81, H2=12.50, R3=9.00, H3=7.50, H2a=0.089, H3a=0.01, G1-G3=0.20, G4=0.38, G5=0.25, G6=0.50, V=26.20 cubic feet and shaft rpm=165. Using W/C of 0.30 to 0.50 and MT of 60-90 seconds, the compressive strength of the cured concrete increased 15-20% as compared to conventionally batched and mixed concrete.

TABLE I

Mortar Flow (ASTM C109) Comparison

| Initial W/C | Conventional[1] | Present Invention[2] |
|---|---|---|
| 0.35 | 93 | 96 |
| 0.40 | 91 | 95 |
| 0.45 | 96 | 99 |
| 0.485 | 98 | 101 |
| Average Flow | 94.5 | 97.8 |

[1] Following standard mixture proportions and procedures of ASTM C109.
[2] Paste mixed separately in the generator of Example 2 then brought to W/C of 0.485 for mixing with standard sand-ASTM C109.

TABLE II

Mortar Strength Comparison 2" Cubes

| Initial W/C | 28 Day Compressive Strength, psi | |
|---|---|---|
| | Conventional[1] | Present Invention[2] |
| 0.35 | 5930 | 6895 |
| 0.40 | 5840 | 6735 |
| 0.45 | 6485 | 7795 |
| 0.485 | 6770 | 8005 |
| Average Compressive Strength | 6256 | 7358 |

[1] Following standard mixture proportions and procedures of ASTM C109.
[2] Paste mixed separately in the generator of Example 2 then brought to W/C of 0.485 for mixing with standard sand-ASTM C109.

It will thus be seen that the objects set forth above, and those made apparent from the preceding description, are efficiently attained and since certain changes may be made without departing from the scope of the invention, it is intended that all matter contained in the above description or shown in the accompanying drawings shall be interpreted as illustrative and not in a limiting sense.

What is claimed is:

1. A building material formed from at least 20% by weight Portland cement, the building material consisting of at least 30% by volume of monolithic crystals of calcium silicate hydrate.

2. A building material according to claim 1 wherein there are at least 75% by volume of the monolithic crystals.

3. A building material according to claim 1 wherein there are at least 95% by volume of the monolithic crystals.

4. A building material formed from at least 20% by weight Portland cement, the building material being substantially uniform monolithic crystals, the crystals having $2\theta$ peaks of $23\pm0.2$ and $37.1\pm0.2$.

5. The building material of claim 1 wherein the monolithic crystals are stratafied plates.

6. The building material of claim 5 wherein each of said plates is substantially hexagonal in shape.

* * * * *